Feb. 26, 1952
C. F. McNERNY ET AL
APPARATUS FOR SEPARATING SUGAR BEETS
OR THE LIKE FROM HEAVIER ARTICLES
SUCH AS ROCKS, SAND, AND MUD
2,586,846
Filed Oct. 12, 1946
6 Sheets-Sheet 6
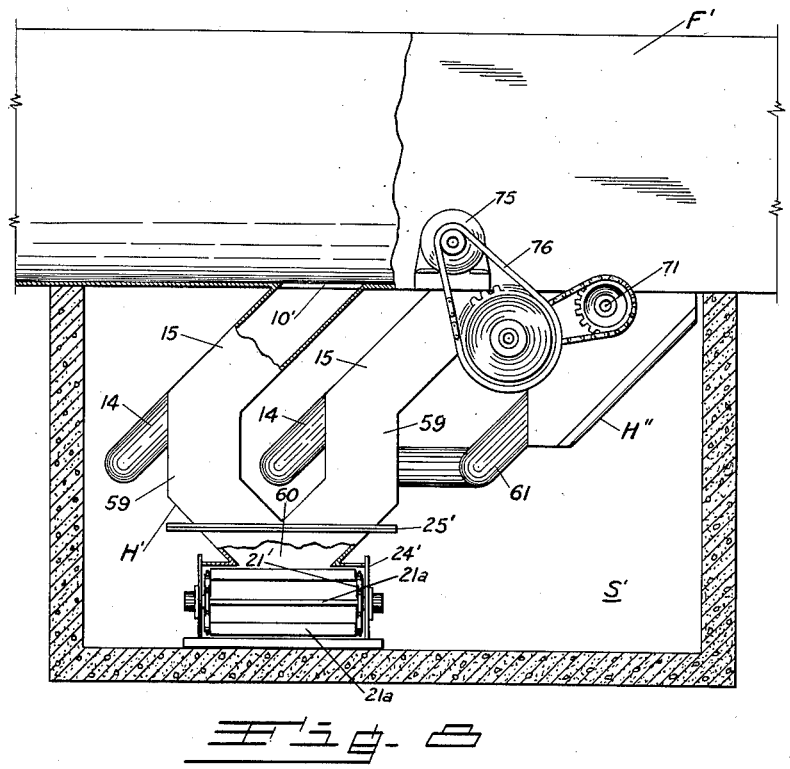
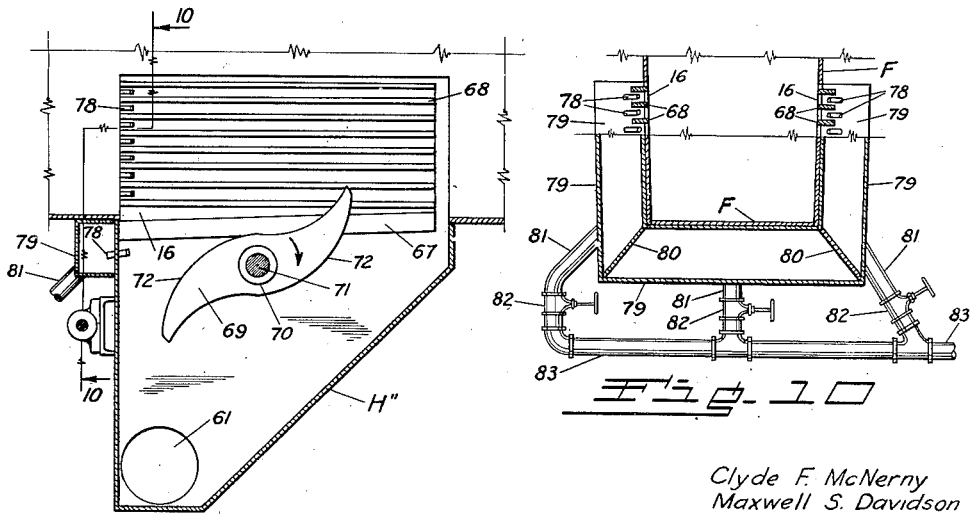
Clyde F. McNerny
Maxwell S. Davidson
Loyd N. Jeffries
INVENTORS
BY
ATTORNEY Patented Feb. 26, 1952

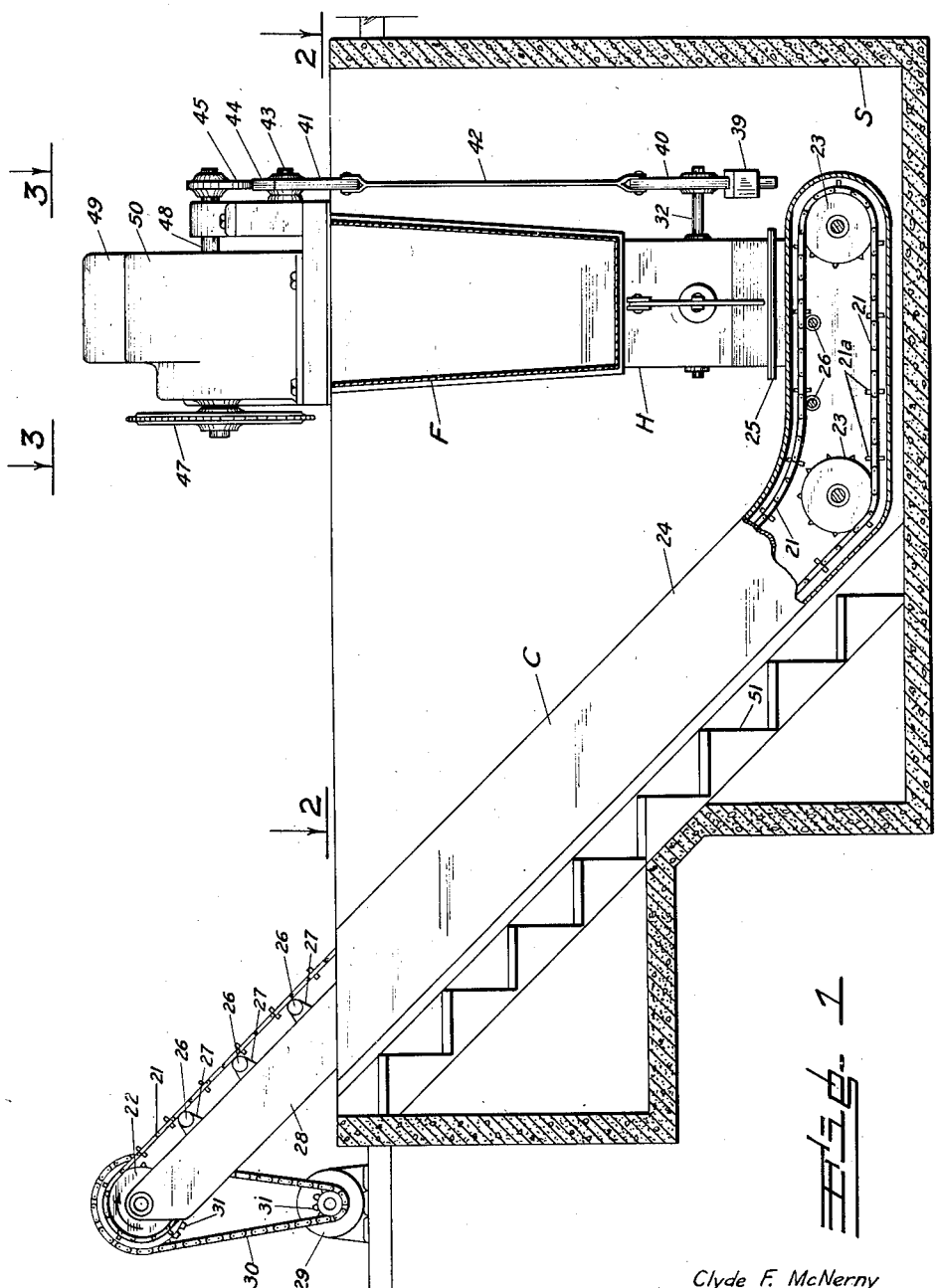

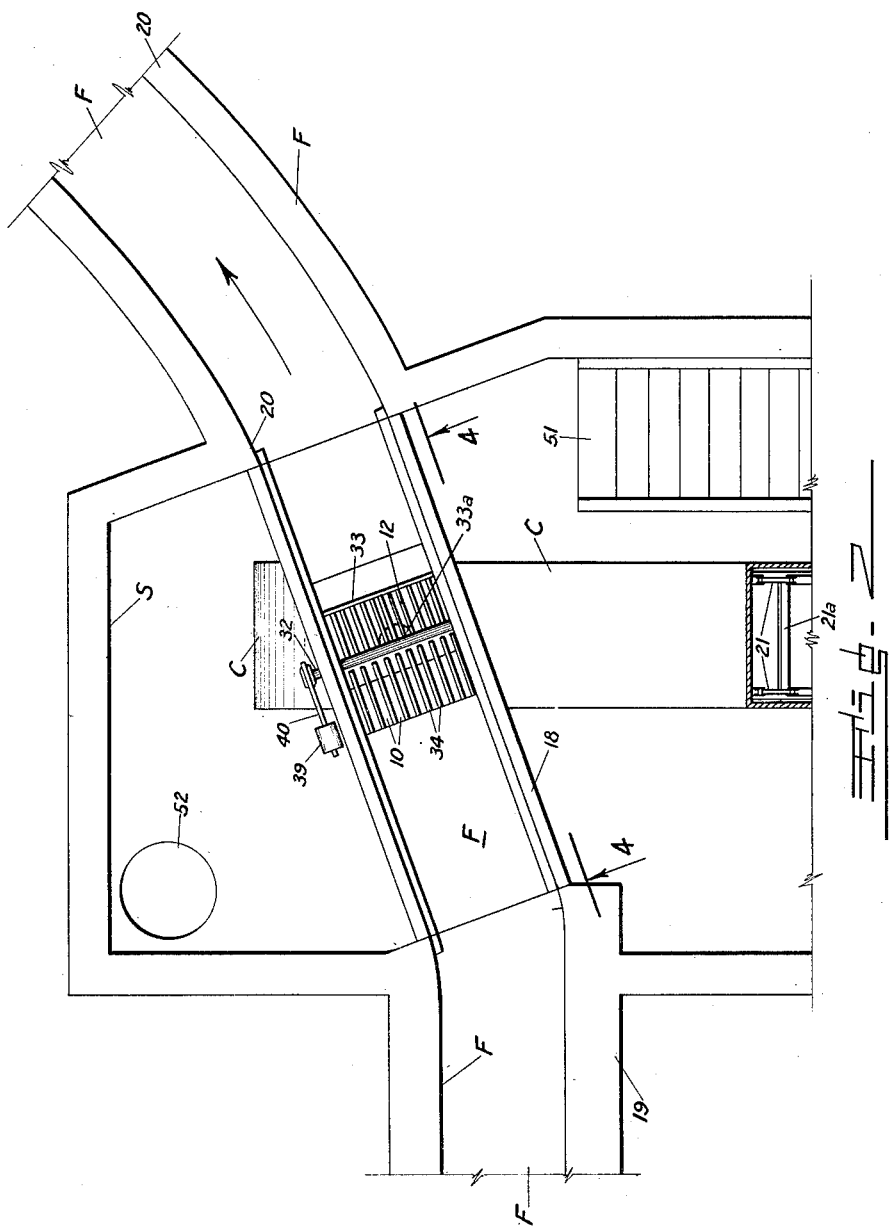

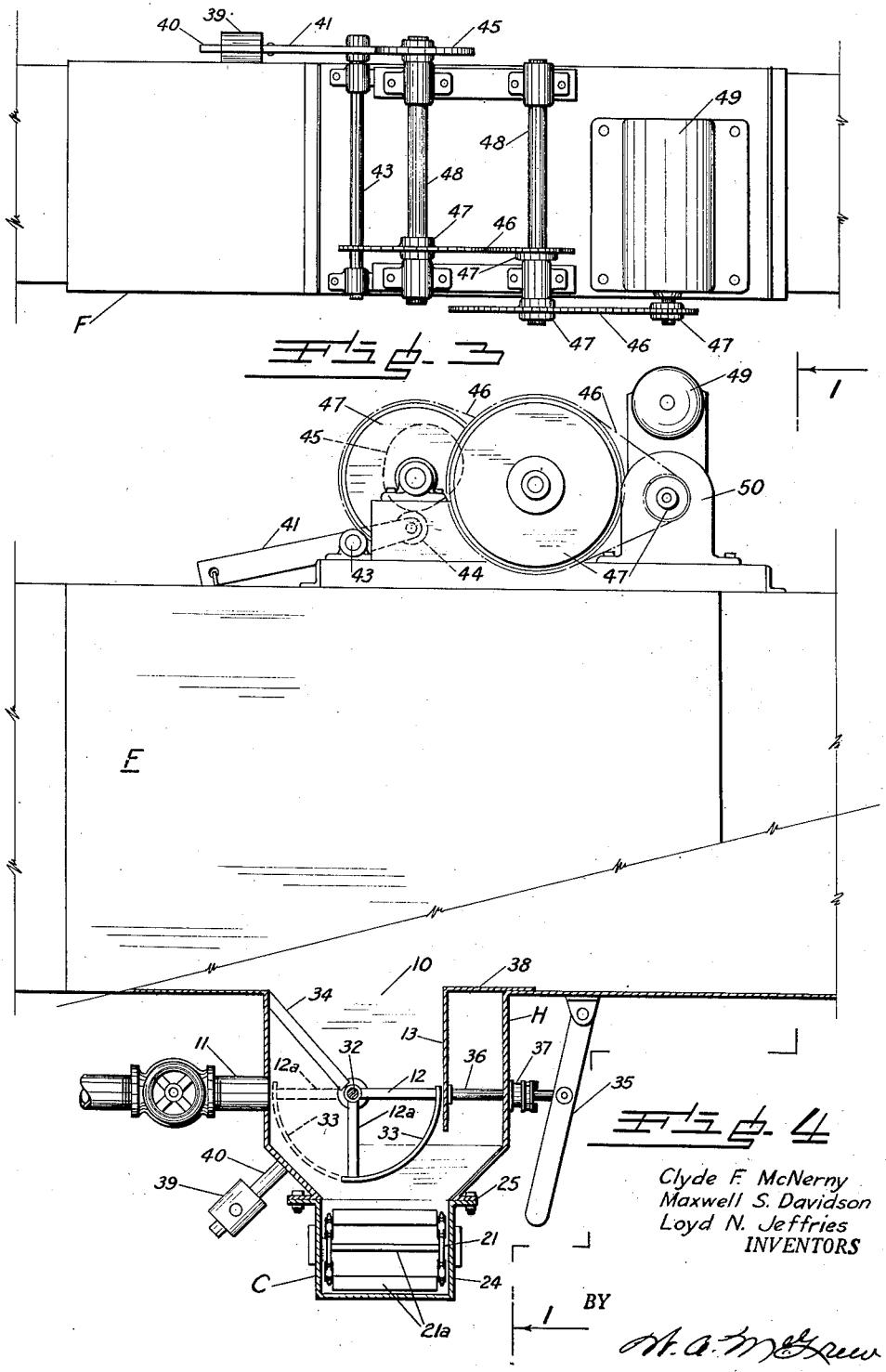

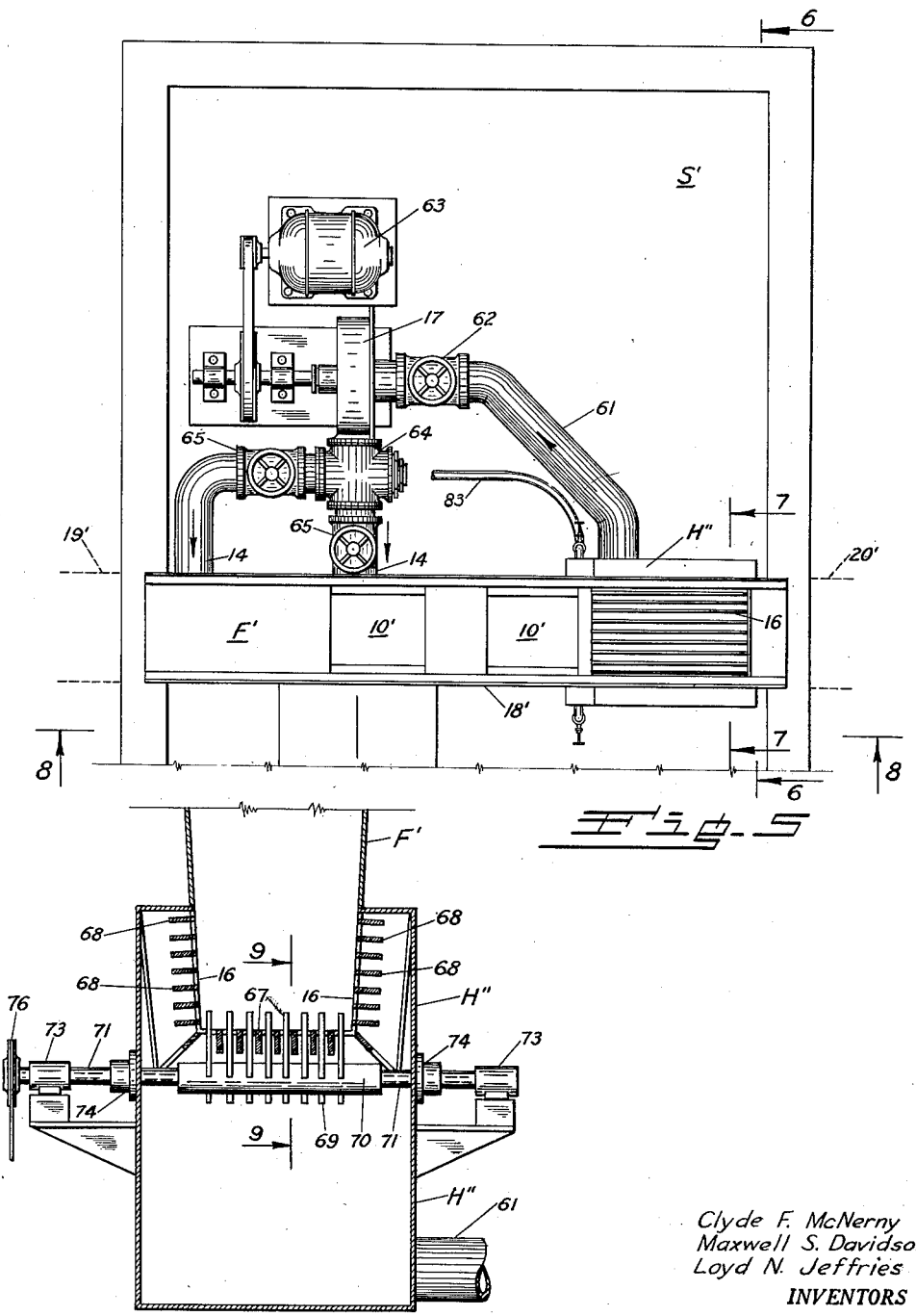

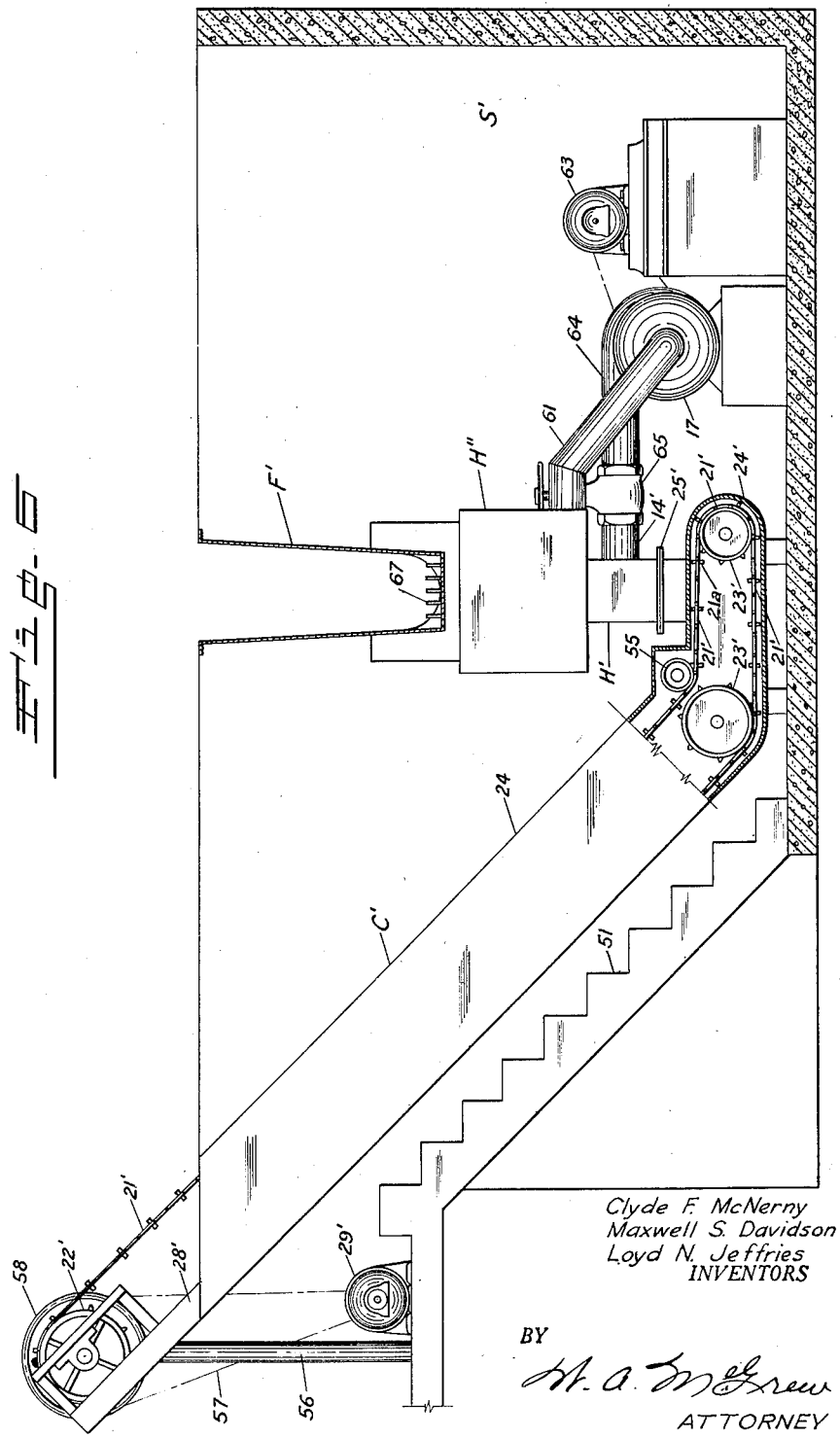

2,586,846

UNITED STATES PATENT OFFICE 2,586,846

APPARATUS FOR SEPARATING SUGAR BEETS OR THE LIKE FROM HEAVIER ARTICLES SUCH AS ROCKS, SAND, AND MUD

Clyde F. McNerny and Maxwell S. Davidson, Denver, Colo., and Lloyd N. Jeffries, Missoula, Mont.

Application October 12, 1946, Serial No. 703,024

3 Claims. (Cl. 209—458)

This invention relates to a method of and apparatus for separating lighter articles, such as sugar beets, from heavier articles, such as rocks, stones, sand and the like, such articles being adapted to be moved along by a stream of fluid, such as water.

When sugar beets are transferred from the beet sheds or receiving and storage points, outside a sugar beet factory, the usual method of conveying the beets into the factory is by providing a stream of water flowing along a flume to carry the beets into the factory for processing. It is almost impossible to separate all the rocks and sand from the beets, and it is highly desirable to separate the same therefrom prior to processing, since a rock, for instance, can practically ruin expensive knives, which are rotated at high speed and slice the beets up into long thin V-shaped cossettes. Also, rocks and sand tend to interfere with the effective operation of beet washers and the like, prior to the time the knives are encountered.

Among the objects of this invention are to provide an improved method of and apparatus for separating articles, more particularly lighter articles, such as sugar beets and the like, and heavier articles, such as rocks, stones, mud balls, earth clods and sand; to provide such a method and apparatus by which a highly effective separation is assured; to provide such a method and apparatus in which the heavier articles are removed by gravity, yet lighter articles, such as beets, do not tend to be removed along with the heavier articles; to provide such a method of and apparatus which may comprise more than one embodiment; to provide such apparatus which may be utilized in carrying out the method of this invention; to provide such apparatus which may be installed in a normal type flume leading from a beet shed or the like to a beet factory or the like; to provide such a method which will be effective in operation; and to provide such an apparatus which will be relatively easy to construct and simple to operate. Other objects and the novel features of this invention will become apparent from the description which follows.

In accordance with this invention, lighter articles such as sugar beets or the like, adapted to be carried along by a stream of liquid such as water, are separated from heavier articles, such as rocks, sand, mud balls and earth clods by establishing a main flowing stream of water, carrying both heavier and lighter articles along a predetermined path, the heavier articles tending to be carried along in the lower portions of said stream, removing the heavier articles from beneath the path along a predetermined area, and directing one or more auxiliary streams of water upwardly toward the area of removal from beneath the path, the auxiliary stream or streams being directed at a sufficient velocity to cause lighter articles, tending to be removed with the heavier articles, to be elevated in the main stream and thereby pass the area of removal. If desired, the heavier articles may be removed at an angle rearwardly to the direction of flow of the stream, and the auxiliary stream may be discharged upwardly at an angle but in the same general direction as the flow of the main stream. In addition, the heavier articles may be removed and an auxiliary stream also provided at a plurality of areas, and the liquid for the auxiliary stream or streams may be removed from the main stream at a point down stream from the area of heavier article removal.

Apparatus particularly adapted to carry out the method of this invention may include means for carrying out the various steps, such as means forming a package for a stream of liquid adapted to carry along the lighter and heavier articles, such passage having an opening adjacent the bottom thereof for removal of the heavier articles, a housing below and enclosing the opening, and a liquid supply conduit leading to the housing. The liquid supplied to the conduit may be removed from the passage down stream from the opening and supplied under pressure to the conduit. In addition, the apparatus preferably includes a conveyor extending to a point in the lower portion of the housing for removing the heavier articles to an elevated point of discharge. The apparatus of this invention may also include numerous additional features, such as included in the apparatus illustrated in the accompanying drawings, in which:

Fig. 1 is an end elevation of apparatus constructed in accordance with this invention, the flume or passage with which the apparatus is associated by being shown in section taken along line 1—1 of Fig. 4;

Fig. 2 is a top plan view of the apparatus of Fig. 1, certain parts above line 2—2 of Fig. 1 being omitted for clarity;

Fig. 3 is a top plan view of the actuating means of the apparatus of Fig. 1, as viewed from line 3—3 thereof;

Fig. 4 is a vertical section taken along line 4—4 of Fig. 2;

Fig. 5 is a top plan view of apparatus also constructed in accordance with this invention, and forming a second embodiment thereof;

Fig. 6 is an end elevation of such apparatus, partly in section taken along line 6—6 of Fig. 5;

Fig. 7 is a partial vertical section taken along line 7—7 of Fig. 5;

Fig. 8 is a side elevation, partly broken away and partly in section taken substantially along line 8—8 of Fig. 5;

Fig. 9 is a partial section taken along line 9—9 of Fig. 7; and

Fig. 10 is a vertical cross section taken along the off-set line 10—10 of Fig. 9.

Apparatus constructed in accordance with this invention, as in the first embodiment shown generally in Fig. 1 and the second embodiment shown generally in Fig. 6, may be utilized in connection with or include a portion of a flume F of Fig. 1 or a flume F' of Fig. 6, the apparatus being installed in a sump S of Fig. 1 or a sump S' of Fig. 6, which the flumes F and F', respectively, cross. The apparatus includes a housing H of Fig. 1 or a housing H' of Fig. 6, connected with an opening in the bottom of the flume for separating heavier articles such as rocks, sand and the like, and a conveyor C of Fig. 1 or a conveyor C' of Fig. 6, for removing the so separated heavier articles to an elevated point of discharge. The flume may be provided with a heavier article removal area, at one opening, such as the opening 10 of flume F, as in Fig. 4, or at two separated openings, such as openings 10' of flume F', as in Fig. 5. In each instance, the rocks and sand which tend to be carried along in the lower portion of the stream of water passing through the flume, tend to fall into the openings 10 or 10'. At the same time, an auxiliary stream of water is discharged into the main stream through the openings 10 or 10' and in an upward direction, so as to elevate the lighter articles, such as beets, which otherwise might tend to be removed with the rocks, and thereby cause the beets to pass over the opening or heavier article removal area. The auxiliary stream of water may be supplied by a pipe or conduit 11, as in Fig. 4, which is deflected upwardly into the main stream in the flume F, as by a gate 12 and a baffle 13 of Fig. 4. Or, the auxiliary stream of water may be discharged at an angle upwardly but in the same general direction as the stream flow in the flume F', as through pipes or conduits 14 of Figs. 5 and 8. In the latter instance, sections 15 of housing H are inclined in the same direction as pipes 14, and the heavier articles are removed at an angle downwardly and rearwardly with respect to the flow of the main stream.

Water supplied through conduit 11 of Figs. 1 to 4, inclusive, may be provided from any suitable source, such as a pressure supply line, or in a manner similar to that of the second embodiment of Figs. 5 to 9, inclusive, as hereinafter described. The water to be supplied under pressure to conduits 14 may be removed from the flume F', as in Fig. 5, through an opening 16, located down stream from the article removal openings 10'. Water removal opening 16 extends across the bottom, and partly up the sides of the flume, as in Fig. 7, and is enclosed by an auxiliary housing H". Suitable means, including a circulator 17 of Fig. 5, may supply the removed water under pressure to conduits 14. As will be observed, a continuous recirculation of water from the water removal opening 16 to the heavier article removal openings 10' is provided, and the water discharged up through the openings 10' insures that the lighter articles, such as sugar beets, will pass over the openings 10' and along the flume.

The flumes are normally formed of reinforced concrete, but the flume F, as in Fig. 2, includes a metal section 18 for crossing sump S, and leads from a concrete upstream section 19 to a down stream concrete section 20, sections 19 and 20 being on opposite sides of the sump. Similarly, as in Fig. 5, the flume F' may include a metal section 18' which crosses sump S', and leads from a concrete upstream section 19' to a down stream concrete section 20'. As shown, the apparatus of this invention may be installed at the beginning of a curve in the flume, as in the first embodiment, or in a straight section, as in the second embodiment, but it will be understood that the apparatus may be installed at any other desired position.

In addition to the elements previously described, the first embodiment, illustrated in Figs. 1 to 4, inclusive, includes numerous other structures. Thus, the conveyor C, as in Fig. 1, includes a pair of endless chains 21 passing around a pair of driving sprockets 22 at the upper end thereof, and two pairs of spaced idler sprockets 23 at the lower end thereof. Drag plates 21a extend between chains 21 at spaced intervals, being attached thereto in a suitable manner, and pull the articles being removed along the bottom of conveyor housing 24 which is connected to the lower end of housing H in a water-tight manner, as by a flanged joint 25. The housing 24 may be constructed in a suitable manner, as by rolled or formed sections joined together in a suitable manner, as by flanged joints, or by welding, where permissible, without interfering with access to the chains and sprockets. As will be observed, heavier articles, such as rocks, mud balls, earth clods, and sand, falling to the bottom of the housing H pass between drag plates 21a to fall to the bottom of housing 24 and are then moved upwardly to an elevated point of discharge, just below driving sprocket 22. Due to the weight of the chains and drag plates, the chains on the return flight may be supported at intervals, as by rollers 26 suitably spaced, and journaled in bearings attached to the side walls of housing 24 or on supports 27 mounted on a beam 28, which also supports housing 24. Driving sprocket 22 for chains 21 may be rotated in the direction of the arrow of Fig. 1 and at a suitable speed by a motor 29, acting through a chain 30 and sprockets 31. Any other suitable method of driving chains 21 may, of course, be utilized.

As in Fig. 4, gate 12 may be formed by a laterally extending series of rods, and a substantially quadri-cylindrical plate 33 may be supported for pivotal movement on a shaft 32 by rods 12b and bars 12a spaced 90° therefrom, each being attached at one end to shaft 32 and at the other end to plate 33. Plate 33 insures that the water from conduit 11 will be discharged upwardly and through opening 10. Gate 12 occupies only a portion of housing H, a plurality of grate bars 34 extending angularly downwardly from the upstream end of opening 10 to a point closely adjacent shaft 32. In normally closed position, the gate rods 12b extend horizontally, and are periodically moved to an open position in which the gate rods extend vertically beneath shaft 32. This permits rocks, sand, mud balls and earth clods, collecting on gate 12 to fall into conveyor C to be carried away. In the open position of the gate rods, plate 33 and bars 12a assume the dotted position of Fig. 4. To insure the continued discharge of water from pipe 11 when plate 33 is moved to this position, the lower edge of plate 33 may be provided with a centrally located opening 33a, as in Fig. 2.

Baffle 13 is preferably adjusted, as in Fig. 4, so as to be sufficiently close to gate 12 to permit the gate to perform its normal function of regulating the passage of material to the conveyor. However, the position of baffle 13 may be adjusted by a lever 35 pivoted on the underside of flume F outside housing H, and pivotally attached to a rod 36 which extends through a packing gland 37 and is attached at its opposite end to baffle 13. A plate 38 is attached to, or formed integrally with, baffle 13 at the upper end of the latter, and extends over the remainder of opening 10, to prevent the passage of material around gate 12, and also to provide a continuity of stream flow in flume F.

Gate 12 is balanced by a counterweight 39, mounted on a lever 40 attached to shaft 32 exteriorly of housing H, as in Figs. 1 and 4. Gate 12 is opened periodically through pivotal movement of lever 40, imparted thereto from an upper lever 41 of Fig. 1, which is connected to the lower lever 40 in a suitable manner, as by a chain, cable or rod 42, as shown. Upper lever 41 is mounted on the overhanging end of a shaft 43, as in Figs. 1 and 3, and is provided with a cam roller or follower 44 which rolls along the edge of a cam 45, as in Fig. 4. Cam 45 is suitably shaped so that gate 12 will be opened for a short interval during each revolution of the cam, and is rotated at a relatively slow speed, such as between 1 and ¼ R. P. M. For the latter purpose, as in Figs. 3 and 4, the cam may be rotated through chains 46 and sprockets 47 mounted on shafts 43, and driven by a motor 49 through an adjustable speed reducer 50. It will be understood, of course, that any other suitable means for providing the desired amplitude and period of oscillation of lever 40 may be utilized, such as hydraulically actuated.

For access to the apparatus in sump S, a stairway 51 or the like may be provided, and also a sump hole 52 may be formed in one corner of sump S, to permit removal of water collecting therein, as by a suitable sump pump.

In the second embodiment of this invention, illustrated in Figs. 5 to 10, inclusive, the conveyor C' is constructed similarly to conveyor C, except that an additional sprocket 55, as in Fig. 6, may be provided on the upper side of the chains at the point of change of direction of travel. Thus, conveyor C' includes chains 21', drag plates 21a, a driving sprocket 22', idler sprockets 23' and a housing 24' connected to housing H' by a flanged joint 25' and supported by a beam 28'. Housing 24' is similar to housing 24 of conveyor C, with slight variation to accommodate differences in structure and in the elevation to which the material is to be raised. Thus, housing 24' extends upwardly to a point at the level of the upper end of flume F'. The upper end of conveyor C' may be supported on a post 56, and the chain driving sprocket 22' rotated from a motor 29' in a manner similar to that of the first embodiment, or by a belt 57 passing over a belt pulley 58.

The housing H', as in Fig. 8, is provided with upwardly slanting sections 15 which enclose, i. e. surround, article removal openings 10'. Below upwardly slanting sections 15 may be vertical sections 59, which converge to flange 25', to cause the removed material to pass through a common passage 60 to conveyor C'. The upwardly slanting conduits 14, as indicated previously, are connected to housing H' at the lower ends of slanting sections 15, and are preferably disposed at the same angle. The connection is preferably made adjacent the upper edge of each section 15, so that the auxiliary stream of water discharged from each conduit 14 will flow through the upper portion of each section 15. This permits any heavier articles which have fallen into openings 10' to pass downwardly along the lower portion of each section 15 and thence to the conveyor C, but at the same time tends to prevent lighter articles, such as sugar beets or the like, from entering the openings 10' and being removed along with the heavier articles. A continuous movement of water into and through openings 10' takes place, this movement tending to cause the lighter articles to be carried higher in the water, and the heavier articles, which will be less affected by the auxiliary streams of water due to their greater specific gravity, to remain in the bottom of the flume and pass into discharge openings 10'. As will be evident, the use of two, or even more, heavier article discharge openings 10' insures that the maximum amount of heavier material will be removed from the stream, since if a heavier article tends to pass over the first removal opening, additional segregation caused by the auxiliary stream discharged into and through the first opening from beneath but in the same general direction as the stream flow, assists in removal of additional heavier material through the second opening. Of course, if relatively large amounts of heavier material are to be removed, it may be desirable to provide three, or even more, removal openings, preferably in series.

Although water may be supplied to conduits 14 from an outside source, it is convenient to recirculate flume water through the article removal openings, and it is preferable to remove this flume water down stream from the second opening 10', as at an opening 16 which is enclosed by housing H''. Such removal not only reduces the amount of piping and the like necessary, but also affords a greater control over the amount of water being passed through the openings 10'. It also provides a region of slower longitudinal flow about the openings 10', since there is more water in the flume at these points, due to the discharge of water thereinto from the conduits 14, thus enhancing the separating action between heavier and lighter particles. Furthermore, the auxiliary stream of water discharged from conduits 14 tends to render the water in the flume more turbulent, which tends to clean adhering matter from the beets. Since this adhering matter often contains rock, sand and the like, a more efficient and effective separation is thereby assured.

In addition to circulator 17, the recirculation means, as in Figs. 5, 6 and 8, may include a drain pipe 61 leading from housing H'' to circulator 17, and provided with a regulating valve 62; a motor 63 for driving circulator 17; and a discharge header 64 connected through valves 65 with the respective conduits 14. A stairway 51' is also provided, similarly to the first embodiment. It will be understood, of course, that other suitable piping and pumping set-ups may be utilized.

As in Figs. 5, 7 and 9, a plurality of bottom grate bars 67 and side grate bars 68 are secured to the flume F' in a suitable manner, as by welding, and extend longitudinally across the water removal opening 16. These grate bars 67 and 68 prevent beets or other articles from being drawn into the water recirculation circuit, and are preferably positioned so as to be in substantial alignment with the bottom and side walls of the flume. However, as in Fig. 6, when the flume has a curved bottom, the bottom grate bars 67, for instance, preferably are in lateral alignment, to permit rotor arms 69, of Fig. 7, to move into and through the spaces between the bars, in a manner explained hereinafter.

Rotor arms 69 are mounted on a sleeve 70, in turn mounted on a shaft 71, as in Figs. 7 and 9, and are rotated in a clockwise direction, when viewed from the position of Fig. 9. In other words, the shaft 71 is rotated in a direction so that the upper segment of each arm 69 moves in a down-stream direction. Also, the leading edge 72 of each segment of each arm 69 is convex, as shown in Fig. 9, so that as the arms rotate any beets or the like tending to collect on the bottom grate bars, due to the suction produced as the recirculation water drains into housing H'', will be pushed down stream without mashing or driving them into the spaces between the grate bars. The arms 69 may be cast, machined, or torch cut from plate, and attached to sleeve 70 in any suitable manner, as by welding. As in Fig. 7, shaft 71 may be journalled in bearings 73 mounted exteriorly on housing H'', and shaft 71 also may extend into the housing through stuffing boxes 74 or other suitable means for producing a substantially water-tight joint. Shaft 71 may be driven, as in Fig. 8, by a motor 75 at a suitable reduced speed, as through a chain and gear reduction unit 76. Although they may be provided if desired, cleaning rotors for the sides of the opening 16 will usually be found unnecessary, since the lower set of arms 69 extends a sufficient distance up the sides of the flume, when in extended upper position, and the suction effect is usually less pronounced at the sides than at the bottom.

For additional cleaning of the spaces between the grate bars 67 and 68, as in Figs. 9 and 10, a set of nozzles 78 may be provided at the upstream end of each space, both along the bottom and along each side. The bottom nozzles may be set at a slight upward angle, such as 7½°, and the side nozzles may be slanted inwardly at a similar angle. Nozzles 78 may be supplied with water under pressure in any suitable manner, such as from a header 79, which extends around the upstream edge of water removal opening 16, and is provided with partitions 80 to divide the header into three sections. Each section of header 79 may be supplied with water under pressure by a pipe 81, provided with a regulating valve 82, and leading from an outside source of water under pressure, or installed as branches of a pipe 83 connected with a high pressure pump, as in Fig. 5.

From the foregoing, it will be apparent that the method and apparatus of this invention fulfills to a marked degree the requirements and objects hereinbefore set forth. Utilization of an auxiliary stream of water, directed upwardly— and more particularly at an angle in the direction of flow of the main stream—through a heavier article removal opening, is a feature of considerable importance. As pointed out, this not only enhances the separating effect between the lighter and the heavier articles but also tends to segregate them more than normally in the main stream. Furthermore, such auxiliary stream or streams tend to prevent the accidental removal of a lighter article. In one embodiment, a periodically opening and closing gate produces a more effective separation and segregation, and the grate bars 34 thereof, which slant downwardly from the upstream edge of the article removal opening, permit the auxiliary stream to be directed into the main stream at all times, irrespective of whether the gate valve is open or closed. In addition, plate 33 insures that the stream will be deflected upwardly during most of the time, when gate 12 is closed. In a second embodiment, the recirculation of the water to form the auxiliary stream adds effectiveness and control to the method and apparatus and compactness to the apparatus. The removal of heavier articles at a rearward angle, and the discharge of the auxiliary streams into the upper portion of the removal housing sections adds effectiveness and efficiency to the separation and segregation between the lighter nd heavier articles. The cleaning rotors, which are particularly adapted to move lighter articles down stream along the grate bars, contribute to smooth separation, since variations in water supplied to the circulator due to temporary or periodical clogging of the grate bars is normally prevented. In both embodiments, the conveyor, which is enclosed at least up to the water level in the flume, permits the removal of heavier articles without loss of flume water.

It will be understood that various changes may be made in the apparatus shown. For instance, in either embodiment the conveyor may be utilized to return to the flume beets accidentally discharged by the conveyor. In such construction, a horizontal apron may be provided between drive sprockets 22 or 22' and the top of the flume, the chains 21 or 21' moving drag plates 21a along the apron. Sprockets may be installed on the opposite side of the flume, and a vertical boot or enclosure provided through which the chains 21 or 21' and drag links 21a pass to the sprocket 23 or 23' beneath, the boot being connected to the lower end of conveyor housing 24. Accidentally removed beets are periodically placed on the apron adjacent sprocket 22 or 22' and are moved along the horizontal apron to the flume. It will be understood that various other changes may also be made.

It will be further understood that, although two embodiments of this invention have been illustrated and described, other embodiments may exist. It will also be understood that the method of this invention may be carried out by apparatus other than that shown herein, and that additional changes in both the method and apparatus may be made, all without departing from the spirit and scope of this invention.

What is claimed is:

1. Apparatus for separating heavier articles, such as rocks and sand, from lighter articles, such as beets, adapted to be carried along by a stream of liquid, such as water, comprising a flume forming a passage for such a stream and having an opening in the bottom thereof for removal of heavier articles; a housing below and enclosing said opening; a conduit of water under pressure leading to the upstream side of said housing; an enclosed conveyor extending into the lower portion of said housing, for carrying removed heavier articles settling in said housing to an elevated point of discharge; downwardly sloping grate bars extending from the upstream side of said opening to a point substantially opposite said conduit; a movable plate forming a portion of the bottom of said flume and provided with a depending flange extending in spaced relation to and below the lower end of said grate bars; means for adjusting the longitudinal position of said flange; a gate shaft extending across said housing at the lower end of said grate bars; gate rods extending from said shaft, said gate rods in closed position being disposed substantially horizontally and beneath the opening between the lower end of said grate bars and said flange and said gate rods being movable to an open position substantially beneath said shaft; an approximately quadri-cylindrical plate disposed in spaced radial relation to said shaft, and supported therefrom; webs attached to said shaft and said plate; a counterweighted lever attached to said shaft outside said housing for moving said gate to different positions; and power actuated cam means operatively connected with said lever for periodically opening and closing said gate, said gate being closed for a longer interval than said gate is open.

2. Apparatus for separating heavier articles, such as rocks and sand, from lighter articles, such as sugar beets, adapted to be carried along by a stream of liquid, such as water, comprising a flume forming a passage for such a stream and having a pair of longitudinally spaced openings in the bottom thereof for removal of heavier articles and a third opening spaced down stream therefrom for removing liquid, said third opening extending across the bottom and up along the sides of said flume; bottom and side grate bars extending longitudinally across said liquid removal opening and aligned with the bottom and sides of said flume; a first housing below said flume for removal of heavier articles and having a section slanting upwardly in a downstream direction and enclosing each opening of said pair; a second housing beneath said flume and extending upwardly to enclose said liquid removal opening; an upwardly slanting liquid conduit leading to each said housing section at substantially the same angle as said housing section and adapted to discharge an auxiliary stream of liquid into the upper portion of said housing section; means including a circulator for removing liquid from said second housing and supplying said liquid under pressure to said conduits; an enclosed conveyor extending into the lower portion of said first housing beneath said sections for carrying removed heavier articles to an elevated point of discharge; a power driven shaft extending laterally through said second housing beneath said bottom grate bars; a plurality of arms rotated by said shaft into the spaces between said grate bars, said arms having convex leading edges adapted to move articles above said grate bars in a downstream direction to prevent clogging of the bottom of said liquid removal opening; nozzles disposed at the upstream ends of said grate bars for discharging jets of liquid in a downstream direction into the spaces between said grate bars; and means connected with said circulator for supplying liquid under pressure to said nozzles.

3. Apparatus for separating heavy refuse from lighter articles carried in a stream of liquid comprising a flume for said stream of liquid, an opening in the bottom of said flume, a first housing enclosing said opening and extending downwardly and rearwardly therefrom, a conveyor housing extending outwardly and upwardly from said first housing, an endless conveyor mounted in said conveyor housing adapted to remove refuse falling thru said opening, a conduit opening into the upstream wall of said first housing and adapted to direct a high velocity jet of liquid upwardly along the upper wall of said first housing, a grating on the walls of said flume downstream from said opening, a second housing enclosing said grating, a circulator connected to said second housing and said conduit, and rotary fingers extending thru said grating and adapted to keep the lighter articles moving in a downstream direction.

CLYDE F. McNERNY.
MAXWELL S. DAVIDSON.
L. N. JEFFRIES.

REFERENCES CITED

The following references are of record in the file of this patent:

UNITED STATES PATENTS

| Number | Name | Date |
|---|---|---|
| 1,017,506 | Burch | Feb. 13, 1912 |
| 1,441,571 | France | Jan. 9, 1923 |
| 1,485,872 | Nelson | Mar. 4, 1924 |
| 1,855,895 | Stump | Apr. 26, 1932 |
| 1,949,354 | Burnside | Feb. 27, 1934 |
| 2,211,895 | Hoyois | Aug. 20, 1940 |
| 2,286,067 | Davis | June 9, 1942 |
| 2,389,611 | Clark | Nov. 27, 1945 |
| 2,456,189 | Harbison | Dec. 14, 1948 |

FOREIGN PATENTS

| Number | Country | Date |
|---|---|---|
| 331,035 | Germany | Dec. 29, 1920 |